US007092228B1

(12) United States Patent
Hochgraef et al.

(10) Patent No.: US 7,092,228 B1
(45) Date of Patent: Aug. 15, 2006

(54) LOW-VOLTAGE POWER BREAKER WITH A RATING PLUG

(75) Inventors: Holger Hochgraef, Ganzer/Wusterhausen (DE); Jeffrey C. Mizener, Sidney, OH (US)

(73) Assignee: Siemens Aktiengesellschaft, Munich (DE)

( * ) Notice: Subject to any disclaimer, the term of this patent is extended or adjusted under 35 U.S.C. 154(b) by 290 days.

(21) Appl. No.: 10/415,149

(22) PCT Filed: Oct. 19, 2001

(86) PCT No.: PCT/DE01/04038

§ 371 (c)(1),
(2), (4) Date: Apr. 25, 2003

(87) PCT Pub. No.: WO02/35569

PCT Pub. Date: May 2, 2002

(30) Foreign Application Priority Data

Oct. 26, 2000 (DE) ................................ 100 54 436

(51) Int. Cl.
*H02H 3/00* (2006.01)

(52) U.S. Cl. ..................................................... 361/93.1

(58) Field of Classification Search ................ 361/93.1
See application file for complete search history.

(56) References Cited

U.S. PATENT DOCUMENTS

| | | | | |
|---|---|---|---|---|
| 4,335,413 | A * | 6/1982 | Engel | 383/926 |
| 4,649,455 | A * | 3/1987 | Scott | 361/93.3 |
| 4,788,620 | A * | 11/1988 | Scott | 361/96 |
| 5,027,091 | A | 6/1991 | Lesslie et al. | 335/132 |
| 5,086,367 | A * | 2/1992 | Ishii et al. | 361/94 |
| 5,136,457 | A | 8/1992 | Durivage, III | 361/93 |
| 5,204,798 | A * | 4/1993 | Scott | 361/93.3 |
| 5,823,323 | A | 10/1998 | Seymour et al. | 200/308 |
| 6,473,281 | B1 * | 10/2002 | Kornblit | 361/42 |

FOREIGN PATENT DOCUMENTS

| | | |
|---|---|---|
| DE | 19845825 | 3/2000 |

* cited by examiner

*Primary Examiner*—Stephen W. Jackson
(74) *Attorney, Agent, or Firm*—Harness, Dickey & Pierce, P.L.C.

(57) ABSTRACT

A rating plug may be provided with an electrical coding such that unsuitable identification of the rating plug is not transmitted to the trigger unit, but rather the attempt to make use of such a rating plug leads to a signal. The signaling unit is arranged on the housing of the low-voltage power breaker, or on the trigger unit. Thus, if the rating plug is the wrong rating plug, wrong contact connection and a defective rating plug may be recorded.

18 Claims, 1 Drawing Sheet

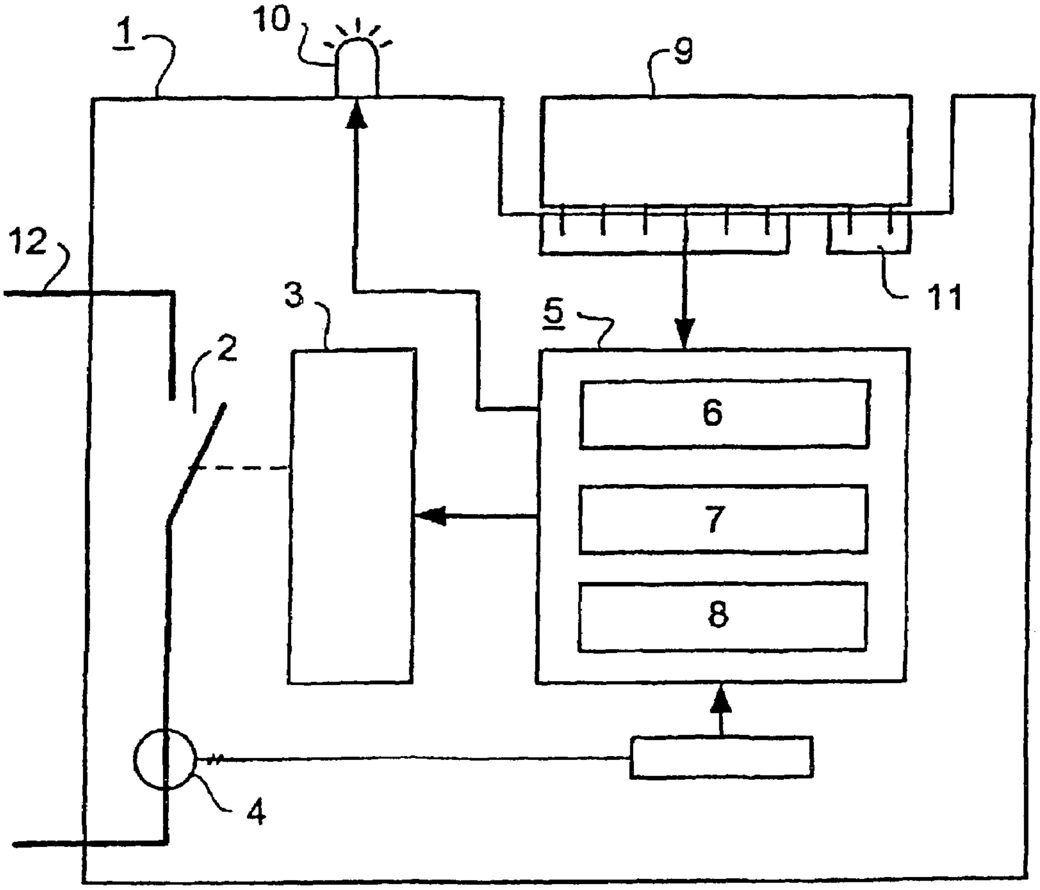
1
10
9
12
3
5
2
11
6
7
8
4

LOW-VOLTAGE POWER BREAKER WITH A RATING PLUG

This application is the national phase under 35 U.S.C. § 371 of PCT International Application No. PCT/DE01/04038 which has an International filing date of Oct. 19, 2001, which designated the United States of America and which claims priority on German Patent Application number DE 100 54 436.3 filed Oct. 26, 2000, the entire contents of which are hereby incorporated herein by reference.

FIELD OF THE INVENTION

The invention generally relates to a low-voltage power circuit breaker having a rated-current plug connector. More preferably, by use of such a power circuit breaker, the electronic tripping unit of the power circuit breaker can be matched to the conditions where it is used. The evaluation device of the tripping unit preferably sets minimum user settings, and a signal is preferably output by a signaling device when an unsuitable rated-current plug connector is used.

BACKGROUND OF THE INVENTION

Power circuit breakers in the low-voltage range should be suitable for use in as wide a rated-current range as possible, for example 200 A to 6300 A. It should therefore be possible to select their rated current. By setting a specific rated current, the appropriate overcurrent release parameters are set for a selected rated current. The overcurrent release may thus be physically the same for the whole rated-current range.

It is known for overcurrent releases to be equipped with a plug-in rated-current plug connector (rating plug) which is fitted with resistors, for example, and by use of which one or more characteristic values can be determined for the switch. It is thus not possible to operate the switch without the rated-current plug connector.

A rated-current plug connector is known, for example, from U.S. Pat. No. 4,649,455. If the rated-current plug connector according to this solution is taken out of the switch, for example in order to replace it with a rated-current plug connector having different user settings, the tripping unit sets itself automatically to a minimum tripping value until a rated-current plug connector has been inserted again. In the simplest case, this is achieved by a setting resistor, which is connected electrically in parallel with the setting resistors in the rated-current plug connector, being arranged fixedly in the tripping unit and determining the rated current when the rated-current plug connector is removed.

In order to prevent unsuitable rated-current plug connectors, which would set a rated current outside the rating limits for the power circuit breaker, from being used, it is known, for example from U.S. Pat. No. 5,027,091, to mechanically code the rated-current plug connector using key-coding.

DE-A 198 45 825 also discloses a solution which uses electrical coding so that unsuitable characteristic values for the rated-current plug connector are not transferred to the tripping unit but, when an attempt is made to use such a rated-current plug connector, a signal is output. The signaling device should be arranged on the rated-current plug connector. A fault signal is output only when the rated-current plug connector is inserted. It is not possible in this way to indicate faults such as the absence of a contact connection between the rated-current plug connector and the tripping unit or the complete absence of a rated-current plug connector.

SUMMARY OF THE INVENTION

An embodiment of the invention is based on an object of further increasing the safety of power circuit breakers with regard to the use and the operation of rated-current plug connectors which are suitable for the power circuit breaker and the use of complex mechanical coding.

An object may be achieved according to an embodiment of the invention. Accordingly, the signaling device is arranged on the enclosure of the low-voltage power circuit breaker or on the tripping unit.

The signaling device may be an audible and/or visual signal transmitter, exactly as envisaged in DE-A 198 45 825, for example a blinking light-emitting diode.

If there are no rating values on the input lines of the plug connection to the rated-current plug connector which are suitable for the relevant power circuit breaker, the evaluation device of the tripping unit sends a signal to the signaling device. In this way, even the states "no rated-current plug connector", "no contact connection", and "defective rated-current plug connector" are also recognized.

BRIEF DESCRIPTION OF THE DRAWINGS

The invention is explained in more detail below with reference to an exemplary embodiment. The associated drawing shows a low-voltage power circuit breaker having an associated tripping unit and a rated-current plug connector.

DETAILED DESCRIPTION OF THE PREFERRED EMBODIMENTS

A circuit 12 is monitored by a power circuit breaker 1. A result is that, if impermissible current values are present across contacts 2 operated by a drive device 3, the circuit is interrupted. The current in the circuit 12 is measured using a current sensor 4. The measured value is processed in a tripping unit 5.

The tripping unit 5 includes a microprocessor 6, a read device 7 and an evaluation device 8. A rated-current plug connector 9 may be inserted in the enclosure of the power circuit breaker 1 and is then connected to the tripping unit 5 via contacts 11. The rated-current plug connector 9 contains the coding for the rated current and, if required, further values, in the simplest case in the form of resistances of defined magnitude.

The values read by the read device 7 are compared in the evaluation device 8 with the permissible values for the relevant power circuit breaker 1. If they are within the permissible limits, they are transferred to the tripping device 5. However, if they are not permissible values because, for example, the rated-current plug connector 9 has been removed, the tripping device 5 transmits a pulsating signal to an LED 10. The LED 10 then blinks and signals to the user that there is a fault. At the same time, the user settings for the tripping unit 5 are changed to minimum values. The signaling and the minimizing of the user settings remain active until a permissible rated-current plug connector has been inserted again.

Instead of being arranged on the enclosure of the power circuit breaker 1, it is also possible for the signaling device to be integrated directly in the tripping unit 5.

LIST OF REFERENCE NUMERALS

1 Power circuit breaker
2 Contacts
3 Drive device
4 Current sensor
5 Tripping unit
6 Microprocessor
7 Read device
8 Evaluation device
9 Rated-current plug connector
10 LED
11 Contacts
12 Circuit The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A low-voltage power circuit breaker, comprising:

a rated-current plug connector;

an electronic tripping unit, setting operating conditions based upon suitable rated current plug inserted in the rated-current plug connector; and a signaling device arranged on at least one of an enclosure of the low-voltage power circuit breaker and the electronic tripping unit, the signaling device outputting a signal and the electronic tripping unit setting minimum settings for the electronic tripping unit being set upon at least one of a suitable rated current plug being removed from the rated-current plug connector and an unsuitable rated-current plug being inserted in the rated-current plug connector.

2. The low-voltage power breaker as claimed in claim 1, wherein the signaling device is at least one of an audible and a visual signal transmitter.

3. The low-voltage power breaker as claimed in claim 1, wherein the signaling device is a blinking light-emitting diode.

4. The low-voltage power breaker as claimed in claim 1, wherein if there are no user settings, on input lines of the plug connection to the rated-current plug connector, which are suitable for the relevant low-voltage power circuit breaker, a signal for operating the signaling device is sent.

5. The low-voltage power breaker as claimed in claim 2, wherein the signaling device is a blinking light-emitting diode.

6. The low-voltage power breaker as claimed in claim 2, wherein if there are no user settings, on input lines of the plug connection to the rated-current plug connector, which are suitable for the relevant low-voltage power circuit breaker, a signal for operating the signaling device is sent.

7. The low-voltage power breaker as claimed in claim 3, wherein if there are no user settings, on input lines of the plug connection to the rated-current plug connector, which are suitable for the relevant low-voltage power circuit breaker, a signal for operating the signaling device is sent.

8. The low-voltage power breaker as claimed in claim 4, wherein if there are no user settings, on input lines of the plug connection to the rated-current plug connector, which are suitable for the relevant low-voltage power circuit breaker, a signal for operating the signaling device is sent.

9. The low-voltage power breaker as claimed in claim 5, wherein if there are no user settings, on input lines of the plug connection to the rated-current plug connector, which are suitable for the relevant low-voltage power circuit breaker, a signal for operating the signaling device is sent.

10. A low-voltage power circuit breaker, comprising:

a rated-current plug connecting means for adjusting operating conditions of an electronic tripping unit of the power circuit breaker based upon a suitable rated current plug inserted in the rated-current plug connector; and signaling means, arranged on at least one of an enclosure of the low-voltage power circuit breaker and the electronic tripping unit, for outputting a signal, the signaling means outputting a signal and minimum settings for the electronic tripping unit being set, upon at least one of a suitable rated current plug being removed from the rated-current plug connecting means and an unsuitable rated-current plug being inserted in the rated-current plug connecting means.

11. The low-voltage power breaker as claimed in claim 10, wherein the signaling means includes at least one of an audible and a visual signal transmitter.

12. The low-voltage power breaker as claimed in claim 10, wherein the signaling means includes a blinking light-emitting diode.

13. The low-voltage power breaker as claimed in claim 10, wherein if there are no user settings, on input lines of the plug connection to the rated-current plug connecting means, which are suitable for the relevant low-voltage power circuit breaker, a signal for operating the signaling means is sent.

14. The low-voltage power breaker as claimed in claim 11, wherein the signaling means includes a blinking light-emitting diode.

15. The low-voltage power breaker as claimed in claim 11, wherein if there are no user settings, on input lines of the plug connection to the rated-current plug connecting means, which are suitable for the relevant low-voltage power circuit breaker, a signal for operating the signaling means is sent.

16. The low-voltage power breaker as claimed in claim 12, wherein if there are no user settings, on input lines of the plug connection to the rated-current plug connecting means, which are suitable for the relevant low-voltage power circuit breaker, a signal for operating the signaling means is sent.

17. The low-voltage power breaker as claimed in claim 13, wherein if there are no user settings, on input lines of the plug connection to the rated-current plug connecting means, which are suitable for the relevant low-voltage power circuit breaker, a signal for operating the signaling means is sent.

18. The low-voltage power breaker as claimed in claim 14, wherein if there are no user settings, on input lines of the plug connection to the rated-current plug connecting means, which are suitable for the relevant low-voltage power circuit breaker, a signal for operating the signaling means is sent.

* * * * *